United States Patent [19]

Willis

[11] 4,441,052

[45] Apr. 3, 1984

[54] DEGAUSSING CIRCUIT FOR TELEVISION RECEIVER HAVING SWITCHED MODE POWER SUPPLY

[75] Inventor: Donald H. Willis, Indianapolis, Ind.

[73] Assignee: RCA Corporation, New York, N.Y.

[21] Appl. No.: 444,542

[22] Filed: Nov. 26, 1982

[51] Int. Cl.³ .............................................. H04N 9/29
[52] U.S. Cl. ........................................ 315/8; 361/150
[58] Field of Search ................... 315/8, 85; 361/150, 361/267; 358/194.1

[56] References Cited

U.S. PATENT DOCUMENTS

| | | | |
|---|---|---|---|
| 3,358,182 | 12/1967 | Bohnstedt | 315/8 |
| 3,784,868 | 1/1974 | Shinkai et al. | 315/8 |
| 3,947,632 | 3/1976 | Giger et al. | 315/8 X |
| 3,955,115 | 5/1976 | Manske | 315/8 |
| 3,986,075 | 10/1976 | Manske | 315/8 |
| 4,262,232 | 4/1981 | Willis | 361/150 X |
| 4,295,078 | 10/1981 | Wilmarth | 315/8 |

*Primary Examiner*—Eugene R. LaRoche
*Attorney, Agent, or Firm*—Paul J. Rasmussen; Peter M. Emanuel; Scott J. Stevens

[57] ABSTRACT

A switched mode power supply for a remote controlled television receiver incorporates a degaussing circuit having a relay that is required to be energized in order to permit operation of the degaussing circuit. Power to energize the relay is derived from a power supply switch transistor protection circuit which removes residual stored energy from the power transformer primary winding. This stored energy is used to charge a capacitor during the time the switch transistor is non-conductive. The capacitor is discharged to provide current to energize the deguassing circuit relay in order to permit ac mains current to flow through the degaussing coil.

7 Claims, 1 Drawing Figure

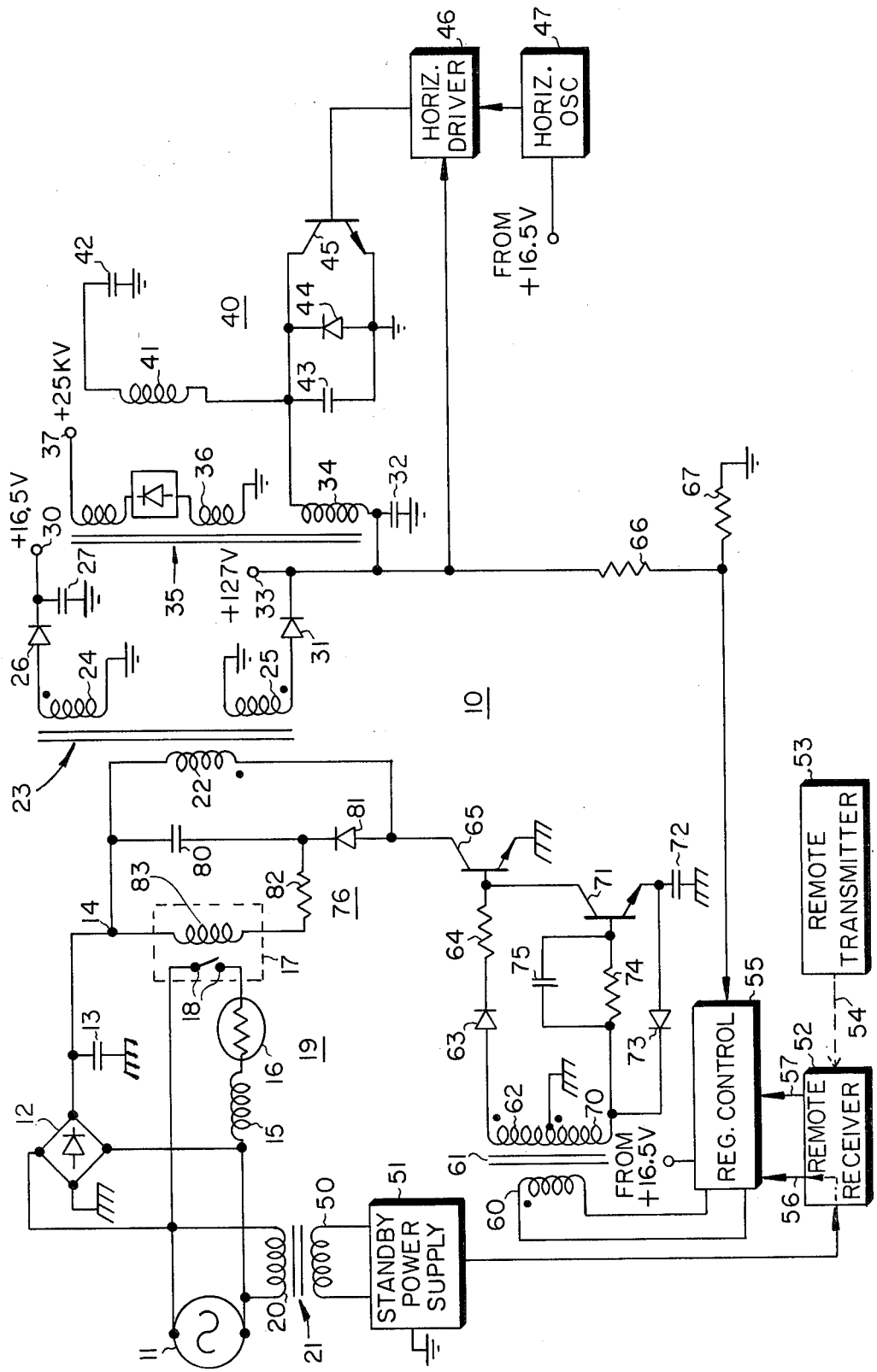

DEGAUSSING CIRCUIT FOR TELEVISION RECEIVER HAVING SWITCHED MODE POWER SUPPLY

This invention relates to degaussing of color television receivers and in particular to an arrangement which provides power to energize a degaussing circuit in a receiver having a switched mode power supply.

Color television receivers may experience magnetization of their metallic parts, including the picture tube shadow mask, by the earth's magnetic field or by external fields generated by electrical equipment, resulting in a change in the electron beam landing positions, thereby degrading the color quality in the reproduced picture. It is therefore common to provide degaussing circuitry for color television receivers that is operated each time the set is turned on. The degaussing circuitry comprises a wire coil that is normally placed around the receiver picture tube in the vicinity of the shadow mask. When the receiver is initially turned on, current from the ac mains supply flows through the degaussing coil. A positive temperature coefficient thermistor, normally in series with the degaussing coil, increases in resistance as a result of heating by the degaussing current flow, thereby causing the degaussing current to decrease in magnitude until it is substantially zero. The diminishing ac degaussing current effectively demagnetizes the tube shadow mask and surrounding metallic components, restoring color purity and reproduced picture quality. The thermistor maintains its high resistance while the receiver is on and requires a finite period of receiver off time to cool in order to provide proper degaussing when the receiver is again turned on.

Receivers incorporating a remote control feature require a modified degaussing circuit in that the ac mains supply is continually applied to the receiver to provide power to the remote control receiver circuit and to the receiver remote control standby power supply, even when the receiver is off. The previously described degaussing circuit requires removal of the ac mains supply to permit the degaussing thermistor to cool.

In order to provide degaussing in receivers having remote control, a relay may be placed in series with the thermistor and degaussing coil and energized from a receiver power source that is only operative when the receiver is turned on, such as a secondary winding of a power supply transformer, as is shown in U.S. Pat. No. 4,295,078, in the name of P. C. Wilmarth, and entitled "Color Television Receiver Degaussing Circuit". This arrangement removes the degaussing circuit from the ac mains supply while the receiver is off so that effective degaussing takes place whenever the receiver is again turned on. This arrangement, however, increases the power dissipation of the receiver due to the current requirements of the degaussing relay whenever the receiver is on.

It is desirable to provide electrical isolation between the ac mains supply and many of the receiver circuits so that direct video and audio signals may be introduced into and derived from the receiver, in order to interface with direct video signal sources, such as home computers and video tape and disc players, and external audio components. Electrical isolation is required in order to eliminate the possibility of user shock and to protect the interconnected components from undesirable electrical stresses. Such electrical isolation is effectively provided through the use of a switched mode power supply having a power transformer with a primary "hot" winding coupled to the ac mains-derived unregulated voltage supply and isolated "cold" secondary windings coupled to the receiver circuits which interface with external components. The primary winding becomes energized by way of current conduction from the unregulated supply which induces voltages across the secondary winding that power the load circuits. The conduction interval of the primary winding is controlled in order to regulate the voltages developed across the secondary windings.

In a remote control receiver, the degaussing circuit energizing relay contacts are coupled to the ac mains "hot" supply. In order to simplify the construction and minimize the cost of the relay, it is desirable that the relay be energized from a similar "hot" supply. With such a relay, the transformer secondary windings of the previously described switched mode power supply cannot be used as shown in Wilmarth since they are "cold"; i.e., are electrically isolated from the ac mains supply. Addition of another "hot" winding on the transformer is not desirable as it increases the cost and complexity of the transformer.

The present invention provides an arrangement for energizing the degaussing circuit relay in a remote controlled color television receiver incorporating an electrically isolating switched mode power supply.

In accordance with the present invention, a switched mode power supply for use in a television receiver having a degaussing circuit for demagnetizing a picture tube comprises a transformer incorporating first and second windings with the first winding coupled to a source of voltage and the second winding coupled to at least one receiver load circuit. A switch is coupled to the first winding and energizes the winding from the voltage source when the switch is conductive such that energization of the first winding develops a voltage across the second winding in order to produce a voltage for powering the load circuit. Means are provided for controlling the conduction of the switch. A protection circuit for the switch is coupled to the first winding and to the degaussing circuit for removing energy from the first winding and coupling at least a portion of the energy to the degaussing circuit.

In the accompanying drawing the sole FIGURE is a schematic and block diagram of a portion of a television receiver incorporating a switched mode power supply constructed in accordance with the present invention.

Referring to the FIGURE, there is shown a portion of a color television receiver incorporating a switched mode power supply 10. The receiver operating power, obtained from an ac mains supply 11, is applied to a bridge rectifier 12 and a filter capacitor 13 to develop a source of unregulated direct voltage and current at a terminal 14. The ac mains supply is also coupled to a degaussing coil 15, to a positive temperature coefficient thermistor 16, and to switch contacts 18 of a degaussing circuit energizing relay 17 of a degaussing circuit 19. Also coupled to the ac mains supply is a primary winding 20 of a standby power supply transformer 21. The degaussing coil is typically placed around a color television picture tube (not shown) in the vicinity of the tube shadow or aperture mask or grill.

The unregulated direct voltage at terminal 14 is applied to a primary winding 22 of a power transformer 23. When current from the unregulated supply flows in primary winding 22, voltages are induced across secondary windings 24 and 25 of transformer 23. The voltage induced across winding 24 is rectified by a diode 26 and filtered by a capacitor 27 to provide a direct voltage at a terminal 30, for example, of the order of +16.5 volts. The voltage induced across winding 25 is rectified by a diode 31 and filtered by a capacitor 32, to develop a direct voltage of the order of 127 volts at a terminal 33. This voltage is applied to one end of a primary winding 34 of a high voltage transformer 35. Energization of primary winding 34 produces an ultor voltage across a high voltage winding 36 of the order of 25 KV at a terminal 37 and provides power to a horizontal deflection output circuit 40.

Output circuit 40 comprises a horizontal deflection yoke winding 41 coupled in series with an S-shaping capacitor 42 which provides correction of symmetrical scan distortion caused by the picture tube geometry. Also included in the output circuit 40 are a retrace capacitor 43, a damper diode 44 and a horizontal output transistor 45. Output circuit 40, via appropriately timed switching of horizontal output transistor 45, produces horizontal deflection current in deflection winding 41 in order to produce the appropriate magnetic fields to deflect the electron beams of the picture tube (not shown).

Horizontal output transistor 45 is caused to switch by switching signals applied to its base from a horizontal driver circuit 46 which is controlled by a horizontal oscillator circuit 47. Horizontal driver circuit 46 is shown as being powered from the 127 volt supply at terminal 33 and horizontal oscillator circuit 47 is shown as being powered from the +16.5 volt supply at terminal 30.

The ac mains supply voltage applied to primary winding 20 of transformer 21 energizes secondary winding 50 which powers a standby power supply 51. Standby power supply 51 supplies power to remote control receiver circuits 52 when the receiver is off in order that the receiver may be turned on via the remote control. A remote control transmitter circuit 53 produces ultrasonic or, more commonly, infrared signals 54 at frequencies dependent upon the receiver function (e.g., on/off, channel change, volume change) that is selected. The remote control receiver circuits respond to these signals to control the appropriate receiver circuits in order to perform the selected function.

Specifically, with respect to the on/off function of the remote control, receipt of a "receiver on" signal by remote control receiver circuit 52 causes power from standby power supply 51 to be applied to a voltage regulator control circuit 55, such as an integrated circuit designated AN5900, supplied by Matsushita Electric Corporation, via a conductor 56. Remote control receiver circuit 52 also applies a signal to voltage regulator control circuit 55 via a conductor 57 which enables control circuit 55 in the absence of its normal operating control signals.

Voltage regulator control circuit 55 generates pulses which energize a primary winding 60 of a driver transformer 61. Driver transformer 61, along with transformers 21 and 23, provides electrical isolation between the receiver circuits which may interface with external components and the ac mains supply. The "hot" components not isolated from the ac mains supply are designated by a particular ground symbol, while the isolated "cold" components are designated by a different ground symbol. Energization of primary winding 60 induces a voltage across secondary winding 62 which applies a voltage via diode 63 and resistor 64 to the base of a switching transistor 65, thereby rendering it conductive.

Conduction of transistor 65 energizes primary winding 22 of transformer 23 by causing current to flow from the unregulated supply through winding 22 and transistor 65 to ground, thereby inducing voltages across secondary windings 24 and 25 by transformer action. As previously described, these voltages are rectified and filtered to provide operating power to various receiver circuits. For example, the +16.5 volt supply at terminal 30 provides normal operating power for voltage regulator control circuit 55.

The voltage level of the +127 volt supply at terminal 33 is sampled by voltage regulator control circuit 55 via a voltage divider comprising resistors 66 and 67 in order to provide control signals to regulator control circuit 55 to adjust the width or duration of the pulses applied to primary winding 60 so as to maintain accurately regulated operating voltage levels for the circuits coupled to the secondary windings of transformer 23.

Secondary winding 70 of transformer 61 becomes energized in response to the termination of current conduction in winding 60. The voltage induced across winding 70 turns on a transistor 71, which provides a low impedance path for the conduction of transistor 65 reverse base current in order to speed up the turn off of transistor 65. Capacitor 72 provides a source of negative bias to further aid in eliminating the stored charge in the base region of transistor 65. Diode 73 provides a path for current of capacitor 72. Resistor 74 and capacitor 75 control the base drive of transistor 71.

When transistor 65 is switched off, the energy stored in the inductance of winding 22 is largely transferred to the secondary windings 24 and 25 in order to generate the load circuit supply voltages as previously described. However, due to the physical insulation requirements of transformer 23 needed to provide electrical isolation between the ac mains supply and the receiver load circuits, the magnetic coupling between the primary and secondary windings of transformer 23 cannot be perfect, with the result that some of the energy stored in primary winding 22 cannot be transferred by secondary windings 24 and 25 to their associated load circuits. If not removed, this energy causes the voltage across winding 22 to rise, which stresses transistor 65 and may damage it. In order to prevent damage to transistor 65, a protection circuit 76, comprising capacitor 80, diode 81 and resistor 82, is provided to remove some of the stored energy in winding 22.

When transistor 65 is switched off, current flows from winding 22 through diode 81 and charges capacitor 80. In accordance with the present invention, resistor 82 is coupled from protection circuit 76 to an energizing coil 83 of the picture tube degaussing circuit relay 17. When diode 81 becomes cut off, capacitor 80 begins to discharge through resistor 82 and relay energizing coil 83. Current flow through relay energizing coil 83 causes switch contacts 18 of relay 17 to close, thereby permitting ac mains supply current to flow through degaussing coil 15 and thermistor 16. As thermistor 16 increases in temperature, its resistance also increases so that the degaussing current decays toward zero. When the receiver is turned off, capacitor 80 voltage and hence coil 83 current will decay, causing switch contacts 18 to open. Thermistor 16 begins to cool in order to be able to conduct sufficient degaussing current when the receiver is again turned on.

The capacitance of capacitor 80 is high enough to apply a substantially constant dc voltage of the order of 150 volts, for example, to the series combination of resistor 82 and relay energizing coil 83 to maintain coil energizing current flow through coil 83 in order to keep switch contacts 18 closed during the time the receiver is turned on.

As previously described, the conduction interval of primary winding 22 is controlled to maintain regulated secondary winding voltages. This regulating control of winding 22 in turn causes the voltage across capacitor 80 and hence the current flow through coil 83 to also be substantially regulated, thereby insuring reliable circuit operation.

By coupling transistor protection circuit 76 to degaussing circuit 19, use is made of stored energy removed from winding 22 that might otherwise have been wasted. Economy is further provided by eliminating the need for additional degaussing circuit energizing components and their attendant power dissipation, while efficiently maintaining electrical isolation between the ac mains supply and the receiver load circuits.

What is claimed is:

1. In a television receiver incorporating a degaussing circuit for demagnetizing the picture tube of said receiver, a switched mode power supply comprising:
    a transformer incorporating first and second windings, said first winding coupled to a source of voltage, said second winding coupled to at least one load circuit of said receiver;
    switch means coupled to said first winding for energizing said first winding from said source of voltage when said switch means is conductive, said second winding responsive to energization of said first winding for developing a voltage across said second winding for producing a voltage to be applied to said load circuit;
    means for controlling the conduction of said switch means; and
    switch means protection means coupled to said first winding and to said degaussing circuit for removing energy from said first winding and applying at least a portion of said energy to said degaussing circuit.

2. The arrangement defined in claim 1, wherein said means for controlling the conduction of said switch means comprises means responsive to said voltage applied to said load circuit for controlling said switch means conduction in order to maintain said voltage applied to said load circuit substantially constant.

3. The arrangement defined in claim 1, wherein said switch means comprises a transistor having a collector electrode coupled to said source of voltage and to said first winding, an emitter electrode coupled to a point of reference voltage and a base electrode coupled to said means for controlling the conduction of said switch means.

4. The arrangement defined in claim 1, wherein said switch means protection means comprises:
    a capacitor coupled to said first winding for being charged by current flow from said first winding when said switch means is nonconductive; and
    a diode poled for permitting substantially only unidirectional current flow between said capacitor and said first winding.

5. The arrangement defined in claim 4, wherein said capacitor provides current to a relay energizing coil of said degaussing circuit in order to energize said degaussing circuit.

6. The arrangement defined in claim 1, wherein said transformer provides electrical isolation between said first and second windings.

7. A remote controlled color television receiver comprising:
    a kinescope subject to becoming magnetized by external magnetic fields;
    a degaussing circuit incorporating a degaussing coil disposed about said kinescope and a relay having an energizing coil, said degaussing circuit being energized periodically in order to demagnetize said kinescope; and
    a switched mode power supply comprising:
        a transformer incorporating a first winding coupled to a source of voltage, and a second winding, electrically isolated from said first winding, coupled to at least one load circuit of said receiver;
        switch means comprising a transistor coupled to said first winding;
        control means coupled between said load circuit and said switch means for controlling the conduction of said switch means in response to the level of the voltage applied to said load circuit, conduction of said switch means causing energization of said first winding from said source of voltage such that a voltage is developed across said second winding in response to said energization for providing a voltage to be applied to said load circuit, said control means controlling said switch means conduction to maintain said applied voltage substantially constant; and
        switch means protection means comprising a capacitor coupled to said first winding and to said relay energizing coil, said capacitor charging from current flow from said first winding when said switch means is nonconductive and discharging through said relay energizing coil in order to energize said degaussing circuit.

* * * * *